Feb. 25, 1941.  A. P. FERGUESON  2,232,778
FENDER WELL TIRE COVER
Filed Aug. 25, 1938  2 Sheets-Sheet 1
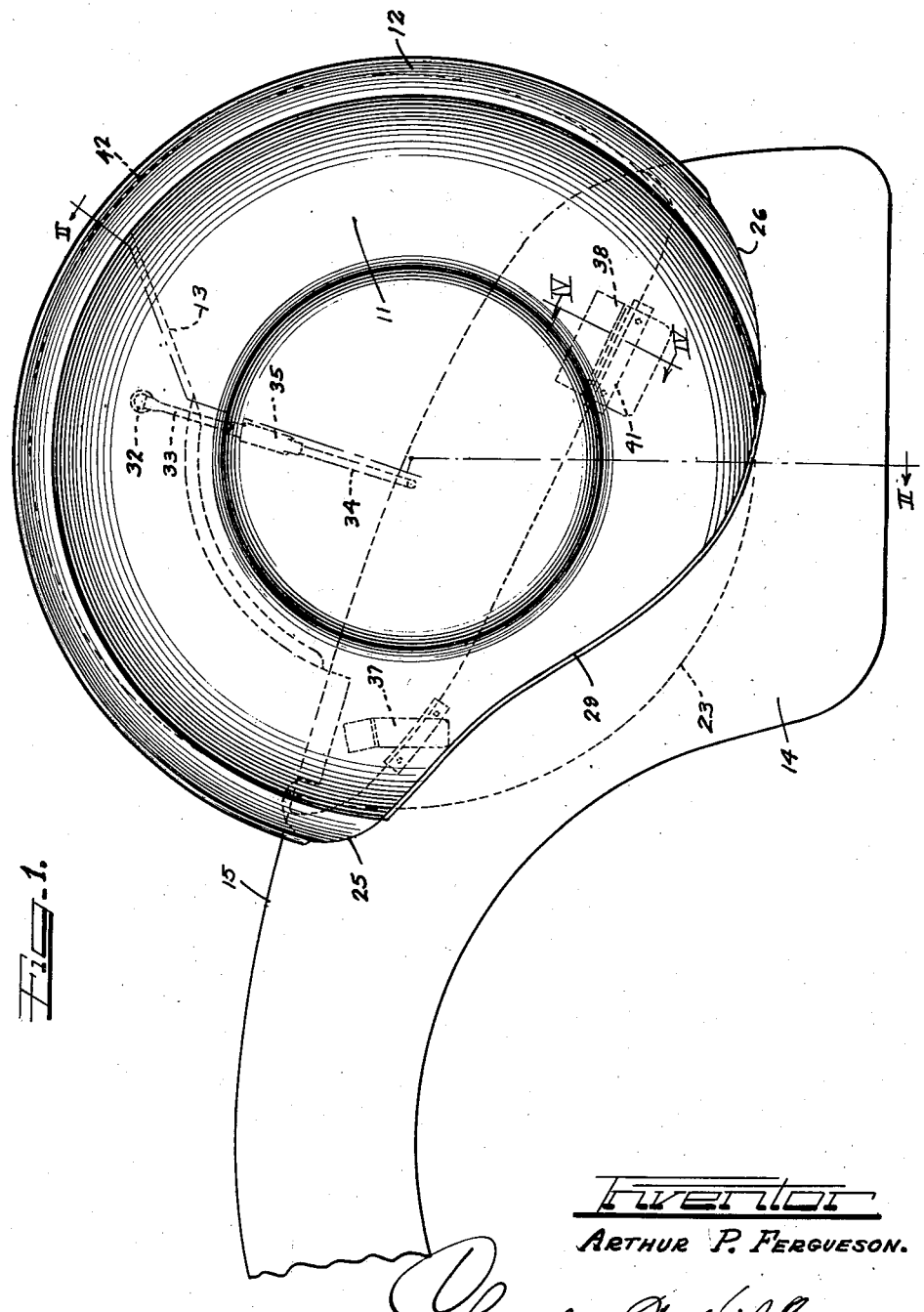

Feb. 25, 1941.  A. P. FERGUESON  2,232,778
FENDER WELL TIRE COVER
Filed Aug. 25, 1938  2 Sheets-Sheet 2
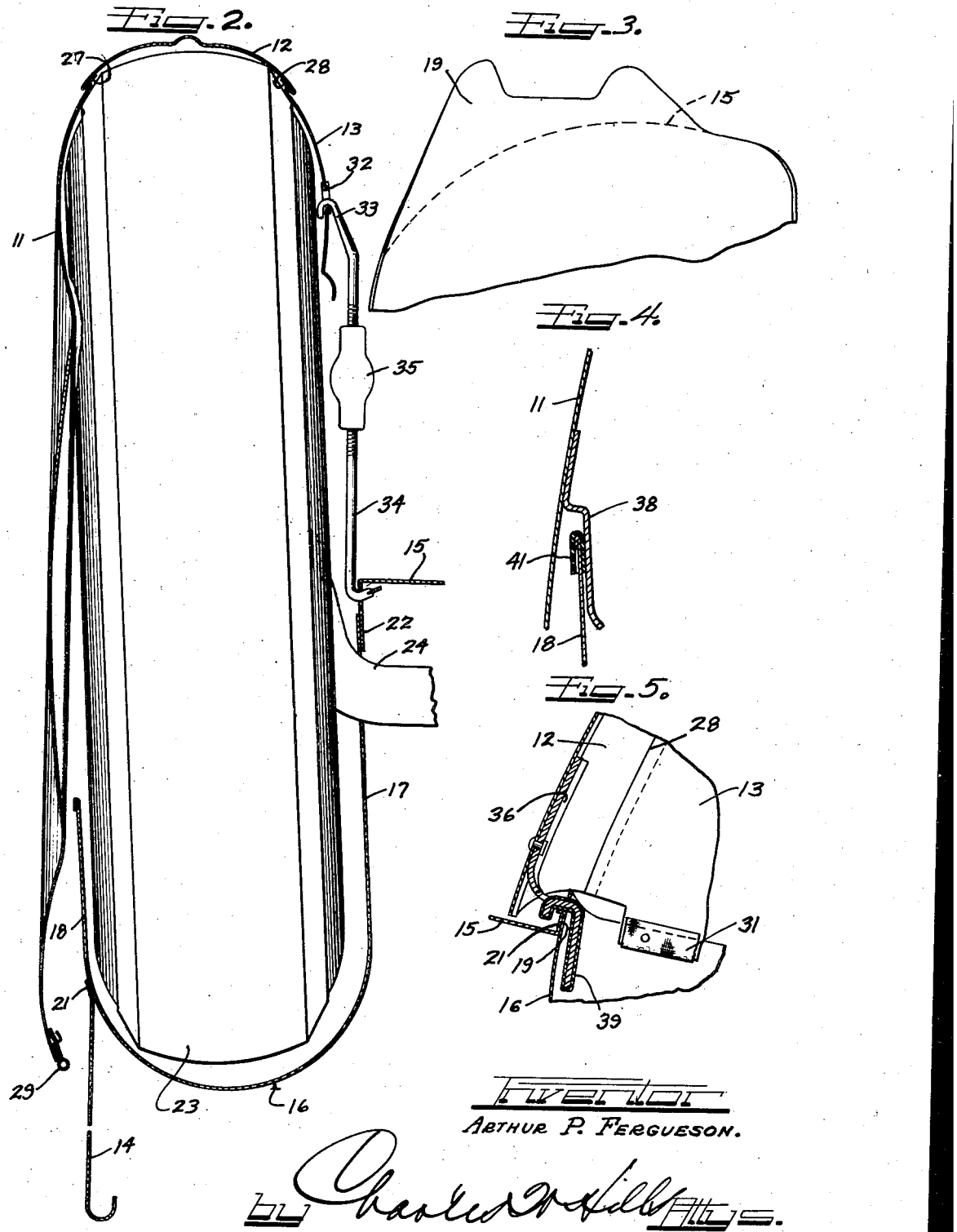

Patented Feb. 25, 1941

2,232,778

UNITED STATES PATENT OFFICE 2,232,778

FENDER WELL TIRE COVER

Arthur P. Fergueson, Detroit, Mich., assignor to Houdaille-Hershey Corporation, Detroit, Mich., a corporation of Michigan Application August 25, 1938, Serial No. 226,647

2 Claims. (Cl. 224—29)

This invention relates to spare tire and wheel covers and more particularly to a spare tire cover for application to a spare tire and wheel carried in a well in a fender of an automotive vehicle.

It is one of the objects of the invention to provide a tire cover of this character which can be readily removed as a unit and which is held in place by a single fastening member.

It is a further object of this invention to provide a tire cover of this character which fits over a tire placed in a well at the edge of the fender, the tire cover depending outside of the fender.

Another object of this invention is to provide a tire cover of this character which is adapted to fit over a tire which is disposed at a small angle to the vertical, as may be necessary to avoid contacting the forward portion of the body of the vehicle, the tire cover itself being vertical and concealing the angular position of the spare tire.

Another object of this invention is to provide a tire cover of this character which can readily be entirely removed so as to facilitate the removal of the spare tire from a deep fender well and which, when in use, is held against rattling at each point of contact with the fender through the action of a single readily removable fastening element.

Further important objects and advantages of the invention will appear as the description proceeds.

In accordance with the general features of the invention, there is provided a sheet metal tire cover made, if desired, of a plurality of pieces spot welded or otherwise secured together into a single rigid assembly which may have a ring portion adapted to cover the exposed part of the periphery of a tire carried in a fender well, an outer side plate portion adapted to cover the exposed part of the outer side of the tire and wheel and to depend outside of the fender, and an inner side portion adapted to cover that part of the inside of the tire which would otherwise be most visible to a person in front of the motor vehicle. Suitable means, such as hooks engaging the sides of the fender well, may be provided adjacent the lower part of the tire cover to aid in positioning it, and the dimensions and proportions of the tire cover may be such as to allow its upper portion to rest directly on the tire at one or more points. Simple means, such as a tie rod similar to a turnbuckle, may be provided to hold the tire cover down, this means, in connection with the other locating means, such as the hooks engaging the fender well and the engagement of the tire cover with the tire itself, serving to completely locate and position the tire cover and prevent it from rattling.

Other and further important objects of this invention will be apparent from the disclosures in the specification and the accompanying drawings.

The invention (in a preferred form) is illustrated in the drawings and hereinafter more fully described.

In the drawings:

Figure 1 is a side elevational view of one embodiment of the invention;

Figure 2 is a sectional view taken on the line II—II of Figure 1, looking in the direction of the arrows;

Figure 3 is a rear elevational view, on an enlarged scale, of the upper edge of the forward part of the fender well, looking forward from the center of the well;

Figure 4 is a cross-sectional view taken on the line IV—IV of Figure 1, looking in the direction of the arrows;

Figure 5 is a longitudinal sectional view taken on the center line of the tire cover and showing the top of the front of the well and the bottom of the front of the tire cover.

The embodiment of the invention shown in the drawings comprises a tire cover 11, 12, 13 used in combination with a fender 14, 15 and a fender well 16. The fender 14, 15 shown in the drawings is of the modern type having a high crown 15 and a depending skirt 14. As this fender is used in an automobile having a comparatively wide body, it is necessary, in order to avoid interference with the body, to have the fender well 16 placed well over towards the outer side of the fender 14, 15. Thus, the inner side wall 17 of the well is in line with the highest part of the crown 15 of the fender while the outer side wall 18 of the well 16 is practically in line with the side or skirt 14 of the fender. Because the fender tapers from front to rear, being narrower at the rear than at the front, a comparatively large portion of the outer side wall 18 projects above the fender skirt 14 at the center and towards the back of the well, while only the upper edge 19 of the well projects up above the crown 15 of the fender near the front of the well. Around the outer side and the front and the rear of the fender well 16, the fender 14, 15 has its edge around the fender well aperture formed into an upwardly extending flange 21 which is spot welded or otherwise secured to the fender well 16. Along the inner side of the fender well aperture in the fender 14, 15, the metal of the fender is formed into a depending flange 22 which is spot welded or otherwise secured to the inner side wall 17 of the fender well. The fender well 16 is thus securely fastened to the fender 14, 15.

The spare tire 23 which is carried in the fender well 16 and the wheel on which the tire 23 is mounted are carried by a bracket 24 which extends through an aperture in the inner side wall 17 of the fender well and which is secured to the frame of the automobile. As may be seen in Figure 2, the wheel and tire 23 are not carried in an exactly vertical position but the top of the tire 23 is tipped out a little away from the center of the car. The fender well 16 is placed at the same angle to the vertical as the tire 23 in order to accommodate it properly. The tire cover 11, 12 and 13, on the other hand, is arranged to lie vertically and to hide the fact that the tire 23 and well 16 are not exactly vertical.

The tire cover 11, 12 and 13 comprises three principal portions, a ring 12, an outer side plate 11, and an inner side plate 13. The ring 12 extends around that portion of the periphery of the tire 23 which projects above the fender and its front and rear ends 25 and 26 are cut off diagonally in order to conform to the outer surface of the fender 14, 15. The two side plates 11 and 13 have flanged edges 27 and 28 which fit against the inner surface of the ring 12 and are spot welded or otherwise secured thereto. Thus the tire cover 11, 12 and 13 is formed into a rigid assembly which is put on and removed in one piece.

The outer side plate 11 of the tire cover covers the entire outside of the portion of the tire 23 which projects above the well 16 and it extends down outside of the well and covers all of the outer side wall 18 of the well which projects beyond the contour of the fender skirt 14 and which would otherwise be visible. The lower edge of the outer side plate 11 is provided with a welt 29 made of fabric and cord or other suitable soft material, in order to prevent accidental scratching or marring of the finish of the fender 14, 15 or of the edge of the side plate 11 when the tire cover is being mounted in place.

The inner side plate 13 is comparatively small and lies alongside of the upper forward portion of the tire projecting above the fender well. The front end of the inner side plate 13, which is arcuate in shape, projects down a short distance inside of the well 16, as shown in Figure 5. An edging 31, made of fabric or other suitable soft material, is secured around the end of the side plate 13 in order to prevent metal-to-metal contact at this point and to eliminate the possibility of squeaking or rattling.

A hole, reinforced with a grommet 32, is provided in the inner side plate 13 near its upper end. The hole and grommet 32 are adapted to receive the hooked upper end of a back bar 33, 34 by means of which the tire cover 11, 12 and 13 is held in place. The lower end of the back bar 33, 34 is also formed into a hook which projects through a hole in the downturned flange 22 which depends from the crown 15 of the fender and to which the inner or back wall 17 of the fender well is secured. The back bar 33, 34 is formed of two separate pieces, 33 and 34, which are joined by a turnbuckle 35 in order that, after the back bar is put into place, it may be tightened down so as to hold the tire cover 11, 12 and 13 firmly against the tire 23.

In addition to being held down by the back bar or stay 33, 34, the tire cover 11, 12, 13 is positioned by means of a stake or hook 36 at the front and two hooks 37 and 38 at the sides. The stake 36, as shown in Figure 5, is secured to the ring 12 of the tire cover by rivets or other suitable means and is formed into a hook which fits over the upwardly projecting edge 19 of the fender well 16. As shown in Figure 3, the upstanding portion 19 of the fender well 16 is formed to provide a notch into which the hook portion of the stake 36 may fit. This aids in properly locating the tire cover when it is being placed in position. The hook portion of the stake 36 is provided with a coating or covering of rubber 39 in order to prevent squeaking or rattling.

The side hooks 37 and 38 are secured by spot welding or other suitable means to the inside of the outer or front side plate 11 and are placed so that they hook onto the upper edge of the upstanding outer side wall 18 of the fender well 16. At the point where the hooks 37 and 38 engage the edge of the wall 18 an edging 41 of fabric or other suitable soft material is provided in order to prevent squeaking or rattling at these points. As will be noted from Figure 4, the hooks 37 and 38 are placed so that they come into contact with the edging 41 only on the inside of the wall 18 and do not come into contact on the top of the wall 18. Thus the hooks 37 and 38 do not stop or limit the downward movement of the tire cover 11, 12 and 13 with respect to the fender well.

As may be seen from Figure 1, the tire cover 11, 12 and 13 is proportioned so that, when it is placed in position, it comes into contact with the periphery of the tire 23 at a point 42 which is some distance in back of the hole and grommet 32 into which the upper end of the back bar or stay 33, 34 is hooked. Thus, when the turnbuckle 35 is turned so as to shorten the back bar 33, 34 and to pull down on the grommet 32, the pressure thus applied will tend to rock the tire cover forward and will hold the hook portion of the stake 36 at the front of the tire cover firmly down in contact with the edge 19 of the front of the tire well. At the same time, since the pull exerted by the back bar 33, 34 is exerted entirely on one side of the tire cover, as may be seen from Figure 2, it will tend to cause the lower portion of the tire cover to swing out away from the fender 14. Such movement will be prevented by the hooks 37 and 38, but the tendency to move in that direction will hold the hooks 37 and 38 in tight engagement with the inside of the outer side wall 18 of the fender well. Thus, when the tire cover is in place and the turnbuckle 35 is tightened, the tire cover will be held firmly against movement in any direction and will not be the source of rattles or other noises, and, at the same time, it may be readily removed by loosening a single fastening device, namely the turnbuckle 35.

In order to further prevent rattling, it may be desirable to so proportion the tire cover 11, 12 and 13 and the side hooks 37 and 38 secured to it, that the distance between the lower end of the inner or back side plate 13 carrying the edging 31 and the plane defined by the hooks 37 and 38 is slightly greater than the width of the tire well 16, so that, when the tire cover is being put into place, it will be necessary to spring the two sides 11 and 13 of the tire cover together a little in order to place the hooks 37 and 38 and the lower edge of the side plate 13 between the two side walls 17 and 18 of the well. Additional pressure will thus be provided to hold the hooks 37 and 38 and the edge of the side plate 13 in tight contact with the sides of the fender well.

From the above description and the accompanying drawings it can be seen that I have provided a simple tire cover which greatly enhances the appearance of the car or vehicle upon which it is used and which may be readily and easily applied or removed. While I have shown my new and novel tire cover used in combination with one specific form of fender well, it may, of course, be used with other fender wells having somewhat similar characteristics, and my invention, therefore, is not limited to the specific form shown and described in this application. My invention, therefore, includes all constructions falling within its true spirit and scope as defined by the terms of the appended claims.

I claim as my invention:

1. As an article of manufacture, a high crown fender well tire cover, comprising a ring portion adapted to cover a tread portion of a tire projecting from a well, an outer side plate portion having a lateral area substantially greater than the lateral area of a projecting tire portion and being adapted to depend on the outside of a fender, hooks on the inside of said outer side plate portion adapted to engage the inside of a well, means at one end of said ring portion for limiting downward movement of said end of said ring portion with respect to a fender, an inner side plate portion rigid with said ring portion and an adjustable means pivotally connected to said inner side plate portion and adapted to be connected to a fender, the range of adjustment of said adjustable means being sufficient to swing said tire cover around the limiting means and tire to engage said hooks with a fender.

2. The combination with a fender having a spare tire well, of a metallic spare tire cover including an outer portion for covering the exposed portion of the outer side wall of the tire and for overlapping the outer side surface of the fender below the mouth of the opening therein, and a tread covering portion for covering the exposed portion of the tire tread above the well, said overlapping portion of the cover having attaching means secured thereto and extending over the fender and into the well for aligning and holding said side portion on the fender, and adjustable tightening means connected to the cover and the fender at the rear thereof for swinging the cover relative to the well to tightly interengage said attaching means and said fender.

ARTHUR P. FERGUESON.